P. B. BOSWORTH.
VEHICLE WHEEL RIM.
APPLICATION FILED APR. 4, 1913.
1,089,899.
Patented Mar. 10, 1914.
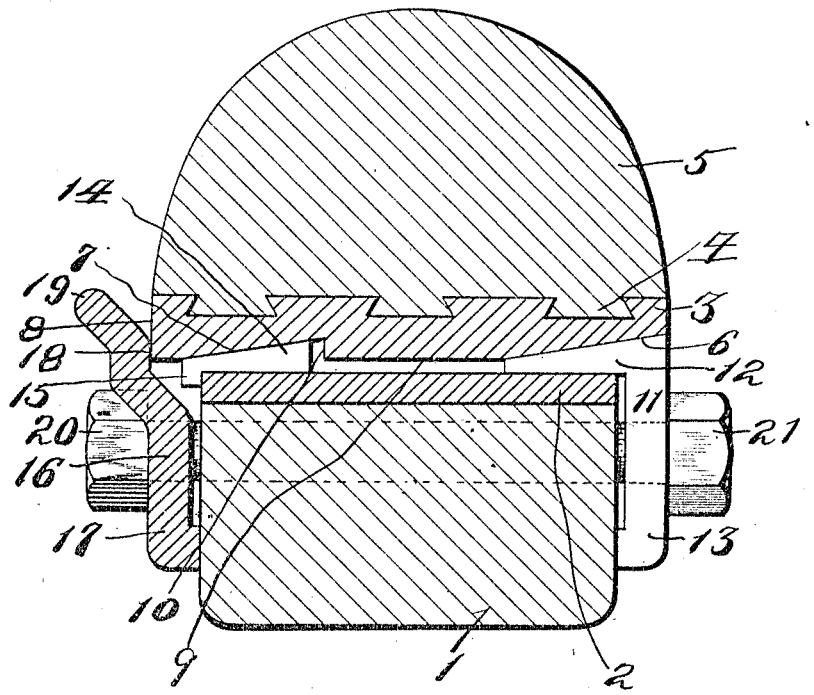
Witnesses
F. Lloyd E. Shannon
G. L. McClintock
Inventor
Percy B. Bosworth
By C. E. Humphrey
Attorney

UNITED STATES PATENT OFFICE.

PERCY B. BOSWORTH, OF AKRON, OHIO.

VEHICLE WHEEL-RIM.

1,089,899.     Specification of Letters Patent.     Patented Mar. 10, 1914.

Application filed April 4, 1913. Serial No. 758,847.

*To all whom it may concern:*

Be it known that I, PERCY B. BOSWORTH, a citizen of the United States, residing at Akron, in the county of Summit and State of Ohio, have invented new and useful Improvements in Vehicle Wheel-Rims, of which the following is a specification.

This invention relates to improvements in vehicle wheel rims equipped for carrying elastic tires.

The object of the invention is to produce a new and improved rim for vehicle wheels designed to carry elastic tires provided with superior means permitting the demounting of the tire from and replacing it on the wheel.

Briefly, this invention belongs to that class of tire-holding rims known as demountable and embodies a novel construction by which the tire may be quickly and fixedly mounted on the wheel rim and demounted therefrom and which will hold the tire securely against independent movement while mounted on the wheel.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the matter hereinafter claimed.

The drawing presented is a transverse sectional view of so much of the rim portion of a vehicle wheel as will illustrate this invention, also showing a tire mounted thereon and my improved tire-retaining means in operative connection, both with the tire and vehicle wheel.

Referring to the drawing the reference numerals 1 and 2 denote respectively, the felly and felly-band of an ordinary vehicle wheel constructed in accordance with the well-known standard now adopted by manufacturers for carrying elastic tires.

Surrounding the felly-band 2 is a band 3 which is preferably provided with corrugations or dove-tailed grooves 4 for use in assisting in holding a tire 5 in position thereon. The cross sectional configuration of the tire aside from the portion which is secured to the band 3 is immaterial and a further description thereof is believed to be unnecessary. The inner face of the band 3 along one of its lateral faces is provided with an inclined face 6 and at another point with an inclined face 7 preferably, although not necessarily, spaced inwardly from the lateral face 8 of the band 3. The normally inner face 9 of the band 3 is united with the inclined face 7, by a shoulder 10, for a purpose to be later described.

Mounted on the outer face of the felly-band 2 is a broken retaining ring 11 provided with a laterally-projecting wedge-shaped flange 12 the outer face of which is inclined and with the inner face thereof fashioned to rest on the outer face of the felly band 2. This member 11 is also provided with an inwardly-extending flange 13 provided with apertures for a purpose to be later described. On the outer face of the felly-band 2 is a second broken ring or annulus 14 the outer face of which is inclined and fashioned to engage the inclined face 7 of the band 3 and with the inner face thereof cylindrical to seat on the outer face of the band 2. The broken ring 14 is also provided at one side with an inwardly-extending lip or flange 15 for a purpose to be later described. The ring 14 and the outer portion 12 of the member 11 are approximately wedge shaped in cross-section and their function will appear later.

Positioned against the side face of the felly 1 is an annularly-formed clamping ring 16 provided with an inwardly-extending flange 17 which rests against the side of the felly and is further provided with an outwardly-extending portion 18 which is adapted to bear laterally against the side 8 of the band 3 of the tire. Extending outwardly from this portion is a laterally outwardly-inclined flange 19. The inwardly-extending flange 17 of the member 16 is provided with apertures arranged in transverse registering relation with respect to the apertures in the flange 13 of the member 11, and the felly 1 is also provided with a series of transverse apertures. Extending in these registering apertures are bolts 20 provided with nuts 21 the function of which is to draw the clamping ring 16 inwardly toward the felly and also at the same time, to shift the band or ring 3 of the tire laterally for firmly seating the tire.

In setting up a wheel of this description, the member 11 is positioned on the felly band 2 and the tire with the member 14 seated in the frusto-conically-formed groove formed by the face 7 with one side thereof resting against the shoulder 10 and the two are then slid laterally onto the felly band 2 until the inclined face 6 of the band 3 rests on the inclined face of the portion 12 of the member 11. During this operation or immediately thereafter, the member 14 is forced laterally in the direction of the member 11 until the inwardly-extending lip or flange 15 thereof engages the side of the felly-band 2. The clamping ring 16 is then positioned and the bolts 20 passed through the apertures in this ring, the felly and the member 11 and the nuts 21 are placed on their threaded ends.

As the nuts 21 are drawn up they tend to force the member 11 inwardly toward the side of the felly and this movement causes the inclined outer faces of the portion 12 and ring 14 to engage the inclined faces 6 and 7 of the ring 3. At the same time, the lateral movement of the member 16 causes the face 18 thereof to force the ring 3 laterally toward the member 11 causing the inclined faces 6 and 7 of the ring 3 to contract the members 11 and 14 to firmly lock them in position.

The member 14 is prevented from being carried too far laterally by the engagement of the lip or flange 15 with the side edge of the felly-band 2 thereby serving to anchor the member 14 securely in position and permit the inner inclined face 7 of the band 3 to slide thereon. When it is desired to dismount or remove a rim embodying this invention, the bolts are removed and if the tire-bearing rim is not easily shifted to the left in the drawing a slight blow on the face of the ring 3 immediately above the member 11 will loosen the engagement between the parts and as the tire-bearing rim is shifted from its seat on the rim the shoulder 10 engaging the side face of the member 14 will carry the latter from its seat on the felly band 2 thereby completely dismounting the tire.

Among the advantages obtained by the employment of this type of rim is that the clamping ring 16 engages the side face of the band 3, and not one of the wedge-shaped rings 11 or 14, and hence, its holding qualities with respect to the tire are much greater. Further, the lateral inclining of the portion 19 of the clamping ring 16 provides a shield for protecting the heads of the bolts, or nuts, as the case may be, positioned within the space bounded thereby. A still further advantage accomplished by this construction is the function performed by the shoulder 10 which when the tire is shifted to dismount the same it carries with it the broken wedge-shaped ring 14 from its seat on the outer face of the band 2.

I claim:

1. The combination with a vehicle wheel, of a pair of wedge-shaped rings positioned on the periphery thereof, one of said wedge-shaped rings provided with an inwardly-projecting flange for preventing its lateral movement, a tire-carrying rim provided on its inner face with a pair of inclined faces adapted to seat on the inclined faces of said wedge-shaped rings, and a clamping ring secured to the side of said wheel and provided with a portion engaging the side of said tire-carrying rim for shifting it laterally to cause snug engagement between said rim and the outer faces of said wedge-shaped rings.

2. The combination with a vehicle wheel, of a pair of broken wedge-shaped rings having inclined outer faces positioned on the periphery thereof, a tire-carrying rim inclosing said wheel and provided on its inner face with a pair of inclined faces adapted to co-act with the inclined outer faces of said wedge-shaped rings, the inner face of said tire-carrying rim further provided with a shoulder adapted to engage one of said rings when said rim is shifted for moving said ring off from its seat on said vehicle wheel, and a clamping ring secured to the side of said vehicle wheel and engaging the tire-carrying rim for shifting the latter to cause inter-engagement between the inner face of said rim and the outer faces of said wedge-shaped rings.

3. The combination with a vehicle wheel, of a broken wedge-shaped ring adapted to be seated on the periphery of said wheel and provided with an outer inclined face and an inwardly-extending flange provided with apertures, a second broken ring provided with an outer inclined face also mounted on the periphery of said wheel, said second ring provided with an inwardly-extending flange engaging the side of said wheel, a tire-carrying rim having parallel inclined inner faces adapted to seat on the outer faces of said broken rings, a clamping ring secured to the side of said wheel and engaging the tire-carrying rim for shifting the latter to set up interengagement between the inclined faces of the rim and broken rings, said ring further provided with apertures, and a plurality of clamping bolts extending through the apertures in said clamping rings and said broken ring for laterally shifting the former.

4. The combination with a vehicle wheel, of a pair of broken wedge-shaped locking rings mounted on the peripheral portion thereof with the outer inclined faces of said wedge-shaped rings extending in the same general direction, both of said wedge-shaped rings provided with inwardly-extending portions for engaging said wheel for preventing their lateral movement, a tire-carrying rim inclosing said wedge-shaped rings and provided on its inner face with inclined portions arranged to co-act with said rings, and a transversely shiftable element secured to said wheel and engaging said tire-carrying rim for shifting the same laterally to cause interengagement between its inner face and the outer faces of said wedge-shaped rings for snugly holding said tire-carrying rim in position.

In testimony whereof I have hereunto set my hand in presence of two subscribing witnesses.

PERCY B. BOSWORTH.

Witnesses:
C. E. HUMPHREY,
A. L. McCLINTOCK.